United States Patent [19]

Smetz et al.

[11] Patent Number: 4,570,305

[45] Date of Patent: Feb. 18, 1986

[54] TENSIONING DEVICE FOR TENSIONING LINES, PARTICULARLY CHAINS OR BELTS

[75] Inventors: Reinhard Smetz, Baldingen; H. H. Speich, Hüttlingen, both of Fed. Rep. of Germany

[73] Assignee: RUD-Kettenfabrik Rieger & Dietz GmbH u. Co., Aalen, Fed. Rep. of Germany

[21] Appl. No.: 677,163

[22] Filed: Dec. 3, 1984

[30] Foreign Application Priority Data

Dec. 6, 1983 [DE] Fed. Rep. of Germany ....... 3344487

[51] Int. Cl.⁴ .............................................. B25B 25/00
[52] U.S. Cl. ................................ 24/68 CD; 24/68 R; 24/71.2
[58] Field of Search .................. 24/68 CD, 68 R, 19, 24/71.2; 254/218; 294/74, 75

[56] References Cited

U.S. PATENT DOCUMENTS

| | | | |
|---|---|---|---|
| 2,993,680 | 7/1961 | Davis | 24/68 CD |
| 3,175,806 | 3/1965 | Prete, Jr. | 24/68 CD |
| 3,749,366 | 7/1973 | Brucker | 24/68 CD |
| 3,804,368 | 4/1974 | Bailey | 24/68 CD |
| 3,826,473 | 7/1974 | Huber | 24/68 CD |
| 4,185,360 | 1/1980 | Prete, Jr. et al. | 24/68 CD |
| 4,199,182 | 4/1980 | Sunesson | 24/68 CD |
| 4,227,286 | 10/1980 | Holmberg | 24/68 CD |
| 4,324,022 | 4/1982 | Prete, Jr. | 24/68 CD |

FOREIGN PATENT DOCUMENTS 579154  12/1956  Italy .................. 24/68 CD

*Primary Examiner*—Victor N. Sakran
*Attorney, Agent, or Firm*—F. Eugene Davis, IV; Mark P. Stone

[57] ABSTRACT

In a tensioning device for tensioning lines having a drive part and a ratchet wheel drivable thereby, a plurality of detent pawls, which are associated with the ratchet wheel, prevent an accidental reverse rotation of the ratchet wheel. The arrangement of the detent pawls is made so that only one detent pawl at a time can come into engagement with a tooth of the ratchet wheel. The reverse rotary stroke of the detent pawl is kept small by an appropriate angular association of teeth and detent pawls.

11 Claims, 4 Drawing Figures

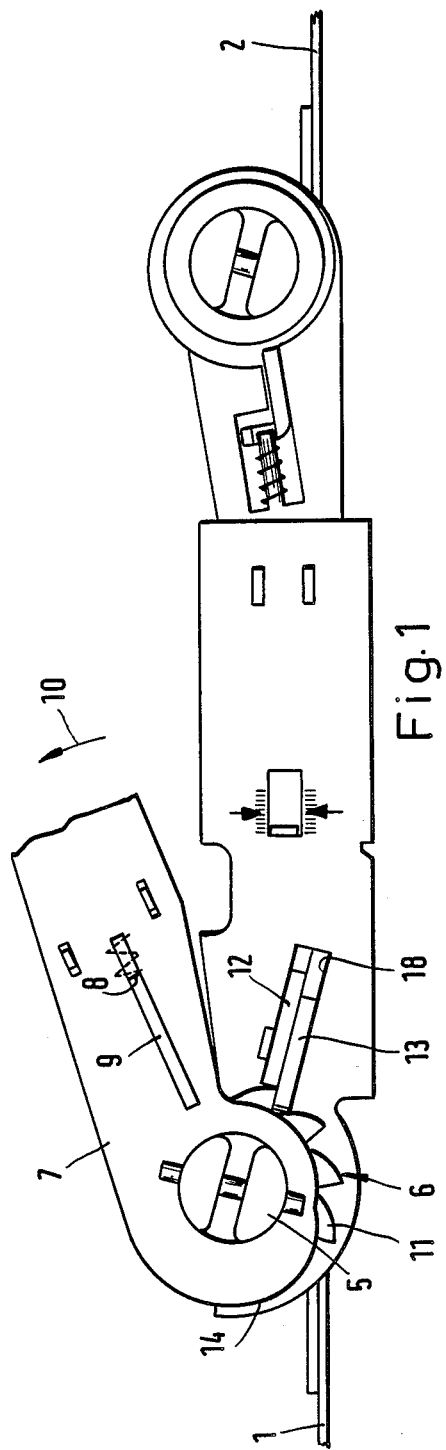
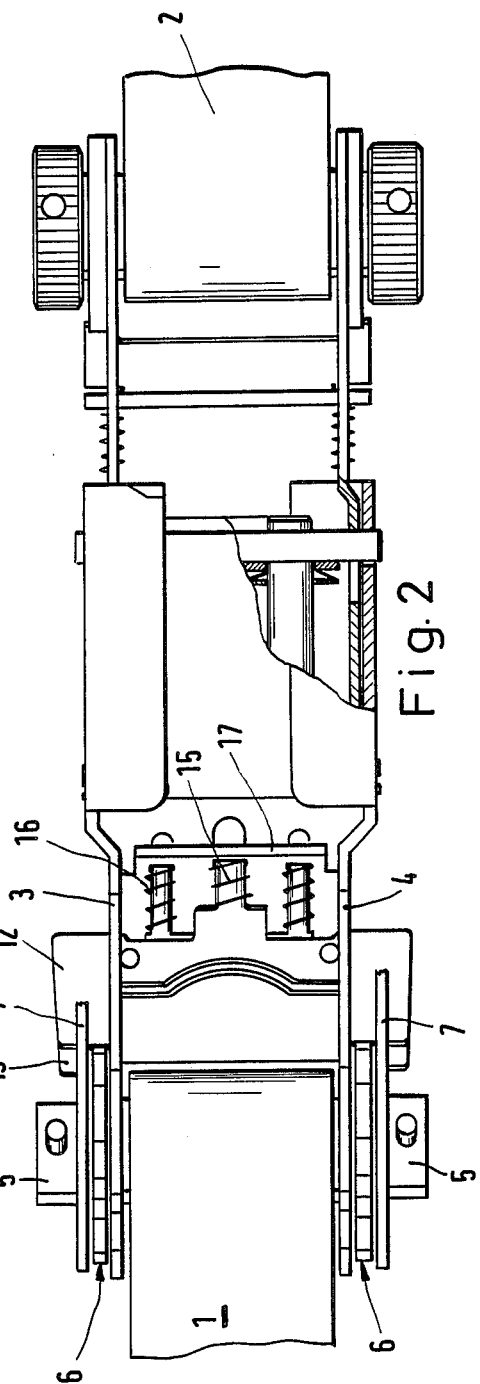

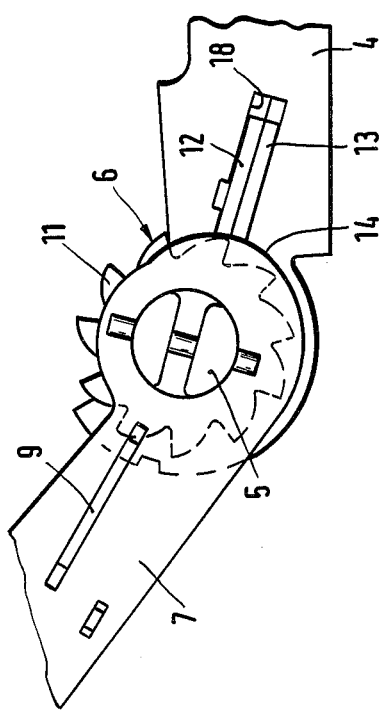
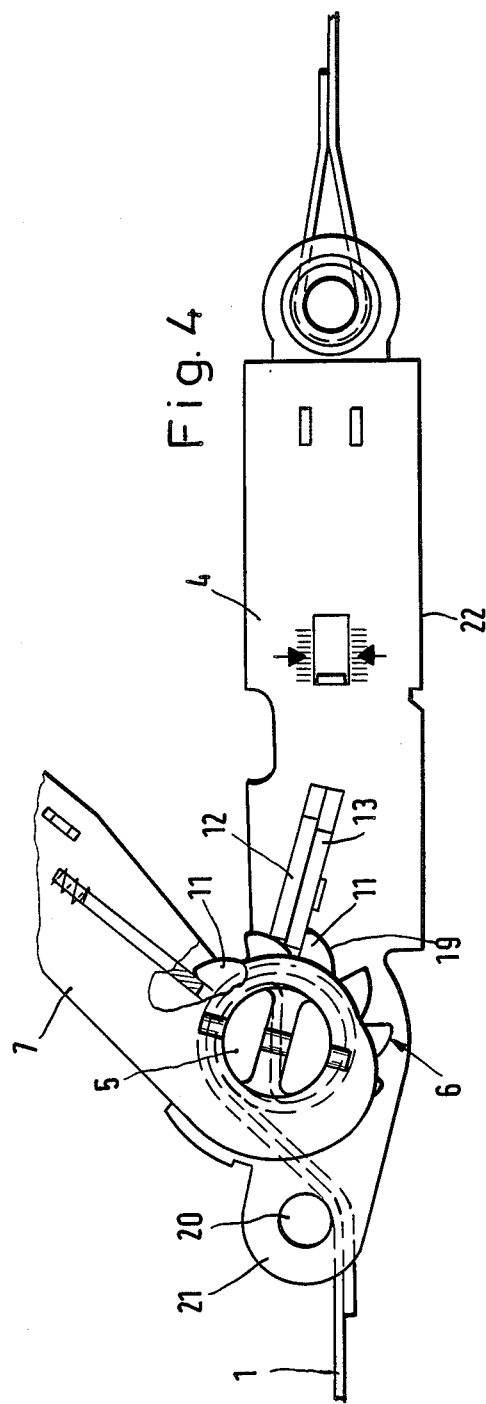

TENSIONING DEVICE FOR TENSIONING LINES, PARTICULARLY CHAINS OR BELTS

BACKGROUND OF THE INVENTION

The invention relates to a tensioning device for tensioning lines, particularly chains or belts, having a rotatable drive element serving to wind up the tensioning line, at least one ratchet wheel connected integrally in rotation thereto and exhibiting directionally oriented notches, and a drive part, serving to introduce the rotary movement into the drive element, on which a drive pawl cooperating with the ratchet wheel is mounted slidably counter to the action of a spring and which is provided with at least one control cam to transfer a blocking mechanism associated with the ratchet wheel into an inoperative position, whilst the notches of the ratchet wheel are shaped so that they are firmly retained by the detent pawl during movement of the drive part in one direction, whereas during the movement of the pivot lever in the opposite direction they are entrained by the latter via the drive pawl.

A tensioning device of the above-stated type is known from U.S. Pat. No. 4,199,182, for example. In the known tensiong device a blocking mechanism, which consists of a single detent pawl, is associated with the teeth or notches of the ratchet wheel. The number of teeth of ratchet wheels is limited by considerations of strength. It is regularly 11, which corresponds to a tooth pitch angle of approximately 33°. Such a large pitch angle frequently makes it impossible to maintain even approximately the high pretensioning force which can generally be achieved per se by a drive part formed by a pivot lever, because on the one hand the engagement of the detent pawl into the next tooth gap of the ratchet wheel would necessitate a further movement of the drive part, which however cannot be managed dynamically, and on the other hand a reverse rotation of the ratchet wheel of not much less than 33° in the least favorable case has to be accepted when the detent pawl engages with the tooth gap reached.

SUMMARY OF THE INVENTION

The underlying aim of the invention is to produce a tensioning device of the type in question which makes it possible, despite the retention of customary ratchet wheels with a comparatively large pitch angle, to keep the pretensioning force losses, which occur during a reverse rotation of the ratchet wheel until it is locked, smaller than with the known tensioning devices.

This aim is achieved according to the invention in that the blocking mechanism exhibits a plurality of blocking elements which can be brought individually into engagement with the notches of the ratchet wheel.

The tensioning device according to the invention presents the advantage that it is possible in simple manner, without substantial modification of the basic construction of known tensioning devices, to retain with the latter pretensioning forces which deviate far less from the maximum pretensioning forces which can be excerted than was hitherto the case.

In order to make it possible also to increase the maximum values of the pretensioning forces, it is recommended to construct the notches of the ratchet wheel as described in the subordinate claim 7.

BRIEF DESCRIPTION OF THE DRAWINGS

Further particulars and features of the tensioning device according to the invention will appear from the further subordinate claims, from the accompanying figures and from the description given below. In the figures:

FIG. 1 shows the side elevation of a tensioning device;

FIG. 2 shows a plan of the tensioning device according to FIG. 1;

FIG. 3 shows a detail of the tensioning device according to FIGS. 1 and 2 in a modified position of the drive part;

FIG. 4 shows a modified embodiment of a tensioning device.

DESCRIPTION OF THE PREFERRED EMBODIMENT

The tensioning device illustrated in FIGS. 1–3 is constructed as a ratchet with an integrated pretensioning force indicating device. It is connected to two tensioning lines 1 and 2 formed by belts. The tensioning line 1 is connected to a drive element 5 mounted rotatably in side walls 3 and 4. The drive of the drive element connected integrally in rotation to two ratchet wheels 6 is effected by a drive part 7, which is formed by a pivot lever in the case illustrated, and in which a drive pawl 9 is guided slidably counter to the action of a spring 8. The drive part 7 is mounted pivotably on the drive element 5. In the case of a movement of the drive part 7 in the direction of the arrow 10, that is to say counterclockwise, the drive pawl 9 entrains the drive element 5. On the other hand, when the drive part 7 is returned the ratchet wheel is retained by a blocking mechanism which exhibits a plurality of blocking elements 12 and 13 which can be brought into engagement with the notches 11 of the ratchet wheel 6. When the tensioning lines 1 and 2 are released, the blocking elements can be moved, as indicated in FIG. 3, conjointly out of the gaps of the notches 11 of the ratchet wheel 6 by control cams 14, namely counter to the action of springs 15 and 16 respectively, which are braced against a cross yoke 17. The blocking elements 12 and 13 are formed in the case illustrated by sliders which are guided conjointly in slots 18 of the side walls 3 and 4.

Due to the fact that a plurality of blocking elements 12, 13 are associated with each gap between the notches 11 of the ratchet wheel 6, the ratchet wheel can be locked in positions which differ mutually by a smaller angular amount than the pitch angle of the ratchet wheel. It is however also possible to associate the blocking elements with different notches 11 and to obtain the same effect.

To permit the greatest possible pretensioning forces to be realised, it is recommended to arrange the notches 11 of the ratchet wheel 6 so that the tooth back 19 of the relevant notch 11 which is in engagement with one of the blocking elements 12 or 13 in the blocked position of the ratchet wheel 6 is remote from the free end of the drive part 7, as FIG. 4 shows. In such a case, a guide member 20 for the tensioning line 1 connected to the drive element 5 should also be provided at an interval from the drive element 5. This guide member is preferably mounted rotatably in bifurcate prolongations 21 of the side walls 3 and 4.

The guide member 20 is positioned so that the tensioning forces introduced by the tensioning line into the tensioning device are directed substantially parallel to the support surface 22 of the tensioning device.

We claim:

1. A tensioning device for tensioning lines, particularly chains or belts, having a rotatable drive element serving to wind up the tensioning line, at least one ratchet wheel connected integrally in rotation thereto and exhibiting directionally oriented notches, and a drive part, serving to introduce the rotary movement into the drive element, on which a drive pawl cooperating with the ratchet wheel is mounted slidably counter to the action of a spring and which is provided with at least one control cam to transfer a blocking mechanism associated with the ratchet wheel into an inoperative position, whilst the notches of the ratchet wheel are shaped so that they are firmly retained by the detent pawl during movement of the drive part in one direction, whereas during the movement of the pivot lever in the opposite direction they are entrained by the latter via the drive pawl, wherein the blocking mechanism exhibits a plurality of blocking elements (12, 13) which can be brought individually into engagement with the notches (11) of the ratchet wheel (6).

2. A tensioning device as claimed in claim 1, wherein the blocking elements (12, 13) are movable conjointly out of the gaps of the notches (11) of the ratchet wheel (6) by the control cam (14).

3. A tensioning device as claimed in claim 1 or 2, wherein the blocking elements (12, 13) are braced against a cross yoke (17) via springs (15, 16) arranged mutually offset.

4. A tensioning device as claimed in claims 1 or 2, which is provided with two blocking elements (12 13), the lateral ends of which are guided conjointly in a slot (18) in each of the side walls (3, 4) of the tensioning device.

5. A tensioning device as claimed in claims 1 or 2, wherein the drive part (7) is formed by a tensioning lever.

6. A tensioning device as claimed in claims 1 or 2, wherein the blocking elements (12, 13) are constructed as sliders.

7. A tensioning device as claimed in claims 1 or 2, wherein the notches (11) of the ratchet wheel (6) are shaped so that the notch back (19) of the respective notch (11) in engagement with the blocking mechanism (12, 13) in the blocked position of the ratchet wheel (6) is remote from the free end of the drive part (7), (FIG. 4).

8. A tensioning device as claimed in claim 1, wherein a guide member (20) for the tensioning line (1) connectable to the drive element (5) is arranged at an interval from the drive element (5).

9. A tensioning device as claimed in claim 1, which exhibits side walls (3, 4) for the rotatable mounting of the drive element (5) which form bifurcate prolongations (21) to house a guide member (20) for the tensioning line (1).

10. A tensioning device as claimed in claim 8 or 9, wherein the guide member (20) is rotatable.

11. A tensioning device as claimed in claims 8 or 9, wherein the guide member (20) is positioned so that the tensioning forces introduced through the tensioning line (1) into the tensioning device are directed substantially parallel to the support surface (22) of the tensioning device.

* * * * *